United States Patent [19]

Chaum

[11] Patent Number: 5,373,558
[45] Date of Patent: Dec. 13, 1994

[54] DESINATED-CONFIRMER SIGNATURE SYSTEMS

[76] Inventor: David Chaum, 14652 Sutton St., Sherman Oaks, Calif. 91403

[21] Appl. No.: 66,669

[22] Filed: May 25, 1993

[51] Int. Cl.$^5$ ............................................. H01L 9/32
[52] U.S. Cl. .......................................... 380/23; 380/24; 380/30
[58] Field of Search .................................... 380/30, 23

[56] References Cited

U.S. PATENT DOCUMENTS

| | | | |
|---|---|---|---|
| 4,947,430 | 8/1990 | Chaum | 380/25 |
| 4,969,189 | 11/1990 | Ohta et al. | 380/25 |
| 5,018,196 | 5/1991 | Takaragi et al. | 380/30 |
| 5,142,577 | 8/1992 | Pastor | 380/23 X |

OTHER PUBLICATIONS

Diffie et al, *New Directions in Cryptography*, IEEE Transactions on Information Theory, vol. IT-22, No. 6, pp. 644-654, Nov. 1976.
Boyar et al, *Convertible Undeniable Signatures*, ESPRIT II Basic Research Actions Program—Contract No. 3075 (Project ALCOM), pp. 189-205.

*Primary Examiner*—Gilberto Barron, Jr.
*Attorney, Agent, or Firm*—Nixon & Vanderhye

[57] ABSTRACT

Cryptographic methods and apparatus for signing (101), receiving (102), verifying (103), and confirming (104) designated-confirmer signatures are disclosed. Such a signature (11) convinces the receiver that the confirmer can convince others that the signer issued the signature. Thus, more protection is provided to the recipient of a signature than with prior art zero-knowledge or undeniable signature techniques, and more protection is provided to the signer than with prior art self-authenticating signatures.

A designated confirmer signature is formed in a setting where the signer creates and issues a public key (201) and the confirmer also creates and issues a public key (202). Should the confirmer offer a confirmation (13), the verifier is convinced that the signature was issued by the signer. Such confirmation can itself be, for example, self-authenticating, unconvincing to other parties, or designated confirmer. With plural confirmers, various combinations may be realized, some even including confirmer anonymity.

24 Claims, 3 Drawing Sheets

S 201
p', q' = random prime
n = p'q'
[21] → R: n

C 202
z = random
[22] S,R ← : $g^z$

DESINATED-CONFIRMER SIGNATURE SYSTEMS

BACKGROUND OF THE INVENTION

1. Field of the Invention

This invention relates to authentication systems, and more specifically to cryptographic protocols involving public-key signatures.

2. Description of Prior Art

The two earliest kinds of public key authentication systems known in the art can be viewed as extremes. A "zero-knowledge" authentication protocol, although convincing to the recipient, does not allow the recipient to convince anyone else. A "serf-authenticating" digital signature technique, on the other extreme, not only allows the recipient to convince anyone, simply by providing a copy of a signature, but also allows anyone so convinced to convince others without limitation.

"Undeniable signatures" strike a balance, somewhere in between these extremes, protecting both the interests of the signer in ensuring that the signatures are not subsequently misused by the recipient as well as the interests of the recipient in providing possibilities for later verification of signatures by others. The recipient of an undeniable signature is convinced that anyone holding it can challenge its signer and that the signer cannot answer falsely. The reason this works is that the signer is always able to convince anyone that a valid signature is valid and that an invalid signature is invalid. Thus the recipient is at least sure that the signer cannot falsely deny a valid signature.

For the recipient, undeniable signatures do have the advantage over zero-knowledge that the recipient has something that can later, under certain conditions, be used to convince others. But for many practical applications these conditions make the protection offered to the receiver too weak. They require the signer to be available and to cooperate in any subsequent confirmation of a signature. If the signer should refuse to cooperate or become unavailable, as might for instance happen in case of default on the agreement represented by the signature, then the recipient cannot make use of the signature.

The three aforementioned prior art authentication techniques—zero-knowledge, self-authenticating signatures, and undeniable signatures—have been disclosed, respectively, as follows: Goldwasser, Micali, and Rackoff, in "The knowledge complexity of interactive proof-systems," Proceedings of STOC '85, ACM press 1985; Diffie and Hellman, "New directions in cryptography," IEEE Trans. Inform. Theory, IT-22(6), November 1976; and U.S. Pat. No. 4,947,430, titled "Undeniable signature systems," by the present applicant.

Related art discloses how a signer can form a private key that can be used to convert all the undeniable signatures made by that signer into self-authenticating digital signatures, as described by Boyar, Chaum, Damgaard, and Pedersen, in "Convertible undeniable signatures," Proceedings of Crypto '90, Springer-Verlag, 1991. Receivers of the undeniable signatures are convinced that all the signatures can be converted by release of the same secret value. This secret value could be provided by the signer to another party who could not use it to create signatures but could release it later, such as in the case of death of the signer. Not only does this technique require signers to establish secret keys that have to be provided to third parties, but no provision for allowing these third parties to authenticate their acceptance of these keys was disclosed. And of course the conversion to self-authenticating form is all-or-nothing: it either applies to all signatures at once or to no signature at all.

Also disclosed by Boyar et al were means to selectively convert some undeniable signatures to self-authenticating signatures. But no provision for receivers to be convinced of the extent to which this is possible has been disclosed. Verifiability by the receiver of the potential for conversion is of course essential, and again no way to achieve it has been disclosed. In fact, the signer simply providing the corresponding self-authenticating signatures to the third party is functionally equivalent to these techniques.

OBJECTS OF THE INVENTION

Accordingly, it is an object of the present invention to:

protect the interests of a signature signer in preventing signatures from being verified without limitation;

protect the interests of a signature receiver in ensuring an ability to convince others of the signature's validity, provided cooperation can be obtained from a third party called the "confirmer";

allow the signer to convince a recipient that the confirmer party is able to confirm the signatures;

require no prior establishment of private keys between signer and confirmer;

allow confirmers to confirm individual signatures without involving other signatures;

give flexibility in the combinations of plural confirmers sufficient to confirm;

offer flexibility in the extent to which confirmers must reveal their identity during confirmation;

allow incorporation of known authentication systems in practical realizations of the inventive concepts disclosed herein; and allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

BRIEF SUMMARY OF THE INVENTION

Figures 1, 2:
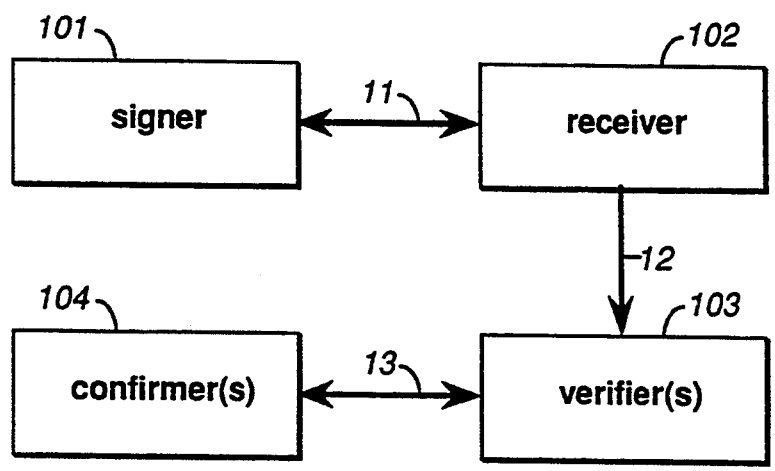
FIG. 1 shows a combination block and functional diagram of a preferred embodiment of a designated confirmer system involving four groupings of parties in accordance with the teachings of the present invention.
FIG. 2 shows a flowchart of a preferred embodiment of a public key issuing by a signer party and a confirmer party in accordance with the teachings of the present invention.

In accordance with the forgoing and other objects of the present invention, a brief summary of some exemplary embodiments will now be presented. Some simplifications and omissions may be made in this summary, which is intended to highlight and introduce some aspects of the present invention, but not to limit its scope in any way. Detailed descriptions of preferred exemplary embodiments adequate to allow those of ordinary skill in the an to make and use the inventive concepts are provided later.

The new signatures solve the problem with undeniable signatures that no confirmation protocol can be performed when the signer is unavailable or will not cooperate. The solution in essence allows the signer to prove to the recipient of the signature that designated parties, presumably believed likely to be available and cooperative if the signer is not, can confirm the signature without the signer. But the signer is still protected, since unless the designated parties confirm, the recipient remains unable to convincingly show the signatures to anyone else.

A basic example protocol involves three principle parties. The recipient of the signature, R, is a party who needs no public key. The signer, S, and the confirmer, C, each have a public key accepted by R. The signing protocol consists only of interaction between S and R. It leaves R convinced that S has provided a designated-confirmer signature, for the agreed message, using S's private key and C's public key. Thus R is convinced that S's signature on the message can be confirmed by C.

A subsequent confirmation protocol itself might involve a verifier V who received the signature directly or indirectly from R. Depending on how much S reveals, confirmation might be zero-knowledge, undeniable, designated-confirmer, or self-authenticating.

A simple example construction approach illustrating some of the inventive concepts of the basic designated-confirmer protocol is as follows: The signature S gives R is a self-authenticating digital signature on the agreed message signed with S's own private key—except that the signature is incomplete in the sense that it "hinges" (as will be described) on the validity of a certain undeniable signature. This undeniable signature is created by S so that it validly corresponds to C's public key. (The reason S is able to create a signature of C in this case is because there is no restriction on the message signed.) To complete the issue of the signature, S proves to R that the undeniable signature is valid.

The interests of S are protected since R cannot prove anything about the transcript of the interaction with S unless help is provided by C. But by virtue of C's private key, C can always help R by proving to any other party that the undeniable signature is valid, thereby convincing that party of the validity of S's original incomplete signature, which hinged on the undeniable signature.

The above approach uses a way to make serf-authenticating signatures that hinge on undeniable signatures. This is believed to have two aspects. If, on the one hand, the undeniable signature itself is not valid and can be chosen freely, then the serf-authenticating signature should be worthless in the sense that anyone could easily have created it. If, on the other hand, the undeniable signature is valid, and someone is convinced of its validity, then they should consequently be convinced of the validity of the self-authenticating signature.

Both properties can be achieved by modification of self-authenticating signature schemes that rely on one-way functions. The modification can be viewed as substituting a "combining" function for the one-way function. The combining function can be thought of as taking two arguments: one is the original one-way function and the other is the pair containing the undeniable signature and message. A simple example combining function would yield the output of the one-way function bit-wise exclusive-OR'ed with the undeniable signature pair.

A property desired of such combining functions, which is believed realized by the above example, is that complete freedom of choice of what should be an undeniable signature allows complete freedom of choice of the result of the new function, but limited choice of the undeniable signature means constraints on the output of the function.

Different properties of confirmation protocols are possible. One essentially makes the confirmation zero knowledge or minimum disclosure; thus, transcripts of the protocol are unconvincing to third parties. Another possibility is that the confirmation yields a self-authenticating signature. Still another possibility is that the confirmation yields a further designated confirmer signature, in effect transferring responsibility for confirmation to another party.

The basic signature scheme can be generalized by including multiple confirmers. More than one confirmer's public key could be combined in the undeniable signature (such as by taking the product of public keys or by making the signature hinge on more undeniable signatures), so that the cooperation of all the confirmers would be needed for any confirmation. The more confirmers required, the harder it would be to get confirmation, and, in some intuitive sense, the closer the signature scheme would approach a zero-knowledge protocol. And if S's key is included, then the result is believed to be minimum disclosure.

Multiple designated-confirmer signatures could give the effect that selected subsets of a set of participants could be required. This raises the issue of whether the identity of the confirmer(s) participating in a particular confirmation are "entangled" in the confirmation process, or if they can be concealed during confirmation. Threshold functions may be a convenient practical case, and efficient ways to achieve these functions are anticipated. Another extreme case would be if a single message were signed separately with each participant's public key serving as a confirmer's public key; this approaches the effect of self-authenticating signatures.

GENERAL DESCRIPTION

The drawing figures and the detailed descriptions provided later make a number of simplifying assumptions for concreteness and for clarity in exposition. It will be appreciated, however, that these should not be taken to limit the scope of the invention.

Lines and arrows in the drawing figures represent messages, which may be held initially or delayed on their way, passed through various parties, encoded and decoded cryptographically or otherwise to provide their authenticity and/or secrecy and/or error detection and/or error recovery. Thus the particular means or methods whereby messages are transferred are not essential to the present invention, and it is anticipated that any technique may be employed in this regard.

The term "party" is used herein to indicate an entity with control over at least the secrecy of some information, usually at least one key. It is anticipated that a plurality of people may each know all or in effect part of some key, and they might be thought of collectively as a party. In other cases, a key may be substantially unknown to people, and reside in some physical device, and then the device itself or those who control it from time to time may be regarded as parties.

Assigning a variable a "random" value performs the function of creating a value that should not be readily determined by at least some party. Many means and methods are known in the art for generating such unpredictable quantities, often called keys. Some are based on physical phenomena, such as noise in semiconductors, or patterns detected in humans pushing buttons, or possibly deterministic cryptographic techniques sometimes called pseudorandom generators. It is well known in the art that these various techniques can often be combined, and that post-processing can often improve the results. Thus the particular means or methods whereby random values are derived is not essential to the present invention, and it is anticipated that any technique may be employed in this regard.

To "convince" or "prove" something or to "transfer conviction" about something to a party are all interpreted to correspond to the notion, widely known and appreciated in the art, of a technical method or means that substantially removes doubt. Typically the removal of doubt relies on the assumption that certain computational problems are substantially intractable. It also typically accepts a probability, of a party being falsely convinced, that is preferably exponentially small in a security parameter. But these typical attributes are not necessary and can sometimes be avoided. If the party receiving conviction does not receive conviction about anything else of substantial utility, then the conviction will be said to be "separate."

The choice of party names, and the number of parties are examples of choices made for clarity and convenience. Naturally, the inventive concepts disclosed here should not be interpreted as limited to a particular type, grouping, or multiplicity of parties nor should there be any other implications of naming conventions or the like.

The notion of a "hinged" signature or "hinging" a signature on another signature, as already mentioned, should be appreciated as a general one. A first signature hinges on a second signature if validity of the second signature implies validity of the first (and thus the hinged signature as whole), whereas unconvincingness of the second renders the first (and thus the hinged signature as a whole) substantially unconvincing.

As will be appreciated, a hinged signature scheme is believed to provide the relative ease of a first task and the relative difficulty of a second task. The substantially feasible first task is to create a valid first signature without a private key corresponding to the first signature but provided that the second signature not be required to be valid. The substantially infeasible second task has the same objective and constraints, except that the second signature must be valid. The ease of the first task can often be ensured directly; the hardness of the second task, it is believed, may be as difficult to verify as the security of the underlying signature scheme.

The notion of a "combining" function, as already mentioned, is an example way of forming a hinged signature. In one exemplary use, already mentioned, and adopted for clarity in the drawing figures, it takes an undeniable signature pair as its first argument and the output of a one-way function as its other argument. But as will be appreciated, and also as to be described, there are many other possible essentially-equivalent forms and other forms offering advantages in certain situations.

An exemplary way of using a combining function to achieve a hinged signature, as already mentioned, is by replacing a one-way function in a signature scheme by a combining function. It is believed essential to this approach that the first signature scheme depends for its validity on the one-way function. That is, if the one-way function is substantially feasible to invert, then signatures can be forged. The other believed essential property is that if the second signature need not be valid, then it should be substantially feasible to produce substantially any desired output of the combining function, which corresponds to any desired output of the one-way function in the original signature scheme.

Thus, the exemplary combining function may be shown as a function taking the output of an undeniable signature scheme and a one-way function as arguments. It can simply be an Abelian group operation, so that inverses are readily computable. Bitwise exclusive-OR, modular addition or modular multiplication are often-used examples of such group operations. The operations could involve the same representation as one or both of the signature schemes, or they could be different. If they are the same, or too close, it is believed that at least in some cases certain "attacks" on the designated-confirmer signatures might be enabled. An example is if it were easier to simultaneously develop an undeniable and a matching self-authenticating signature satisfying a relation imposed by a simple combining function, as opposed to in effect being forced to develop one signature and then try to find the other one. Thus, at least in some instances, it may be desired to introduce substantial complexity and certainty about the relative potential for cooperation between the types of operations used.

The desired property of invertability in a combining function could be maintained while introducing almost any desired degree of additional complexity in the combining function. Easily computed and inverted mappings, called "conditioning" functions here, such as those made from linear mappings and block ciphers with known keys, might be applied in an effort to destroy multiplicative or other structure that might introduce weakness. More specifically, as will be appreciated by those of skill in the art, extremely complex but still invertible functions can readily be formed from so called "substitution-permutation networks" where the substitutions are block ciphers (such as DES) with known keys and where the permutations have good diffusion properties. On the other extreme conditioning functions simply relying on use of different representations may be adequate in some situations.

A combining function can, accordingly, apply a conditioning function to any of its inputs or combinations of inputs. In particular, it may be desired to apply such a function to the pair comprising the undeniable signature input. Similarly, after the group operation(s) used to combine the inputs, the result can be further conditioned before being returned as output by the combining function.

It will also be appreciated that the one-way function is assumed for simplicity and clarity to have been applied to the message before it is input to the combining functions. Of course the one-way property could be included in the combining function instead. Some parts of the message could themselves then be included in other parts of the combining function, and conditioning could be applied to them. Certain parts of the undeniable signature, such as one element of the pair, could also enter into a one-way function possibly in combination with other inputs. It is believed necessary, however, that the part that does not enter into the one-way function should be large enough to provide any output of the combining function. In some situations, no message may be needed and a constant could be substituted.

Multiple confirmers can be allowed, as already mentioned. For instance, two confirmers could be required using a combining function taking two undeniable signatures, such that $h(u_1, u_2, f(m)) = u_1 + u_2 + f(m)$, where the conditioning functions are not shown for clarity and the addition is the group operation. This would require two confirmers. By including more terms, more confirmers could be required simultaneously. Clearly, issuing multiple designated-confirmer signatures would mean that either one of them could be confirmed. Thus, as would be obvious to those of skill in the art, any monotonic predicate could be implemented. A simple, two-out-of-three confirmer scheme, for instance, could use three designated-confirmer signatures, each containing a different combination of two confirmers' undeniable signatures.

It is anticipated that by use of suitable polynomials, for instance, more efficient threshold schemes may be achieved. Furthermore, it is also anticipated that configurations of confirmers able to confirm could be hidden from the receiver, while still convincing the receiver that the configuration is included in some set of agreed configurations.

More generally, in some situations it may be desired for the verifier to be convinced of which confirmer is actually confirming a signature; in other situations, it may be desired that which confirmer is confirming not be revealed. This unlinkability of confirmation to public keys is believed able to take two forms. The set of public keys of confirmers may be known, in which case only the relative anonymity within that set is provided, such as is mentioned above. In other cases, the verifier may not know the public key of the confirmer, and, as may be desired, it should not be revealed by confirming.

Turning now to FIG. 1, general descriptions of the interconnections and cooperation of the constituent parts of some exemplary embodiments of the inventive concepts will now be presented.

Signer party 101 has at least a private key. A corresponding public key is made known to receiver 102 (as will be more fully described with reference to FIG. 2). Signer 101 makes one or more designated-confirmer signatures (as described in FIG. 3). These signatures are provided to receiver party 102 as indicated by connecting line 11. Also provided via line 11 is a transfer of conviction that the signature is valid. This may typically require interaction between signer 101 and receiver 102, but some kinds of transfer of conviction known in the art do not require interaction.

Each signature is related to a message, the origin of which is not essential to the inventive concepts. Messages could, for example, come from the signer 101, the receiver 102, a third party not shown for clarity, random sources, external events, or combinations of these. Both signer 101 and receiver 102 may be aware of the message before they cooperate in a signature issuing protocol, or one or the other of them may supply all or parts of the message to the other as a part of the signature issuing protocol, such provision not being shown for clarity.

Receiver party 102 obtains a designated confirmer signature from signer 101, via line 11. This signature can then be provided by receiver 102 to verifier(s) 103, via line 12; a signature is data that can be held by receiver 102 and then, at a certain moment, it can be communicated to one or more verifiers 103. A verifier 103 may in turn provide copies of the signature data to other verifier parties 103 or the signature data may be communicated directly from signer 101 or receiver 102 to other verifiers. In particular, a receiver can participate as a verifier.

Verifier(s) 103 are parties, thought of for convenience, but not necessarily, distinct from the other parties shown, that will be convinced of the validity of the designated confirmer signature. One or more verifiers 103 may be convinced that the signature is valid by cooperation of confirmer(s) 104. This may involve interaction between verifiers 103 and confirmers 104 over line 13, or the conviction may be transferred by data transferred only from a confirmer 104 to verifier(s) 103.

Confirmer(s) 104 are parties that use their private keys, that correspond to their public keys, to convince verifier(s) 103 of the validity of signatures. More than one confirmer 104 may be able to confirm the same signature or plural confirmers, acting together or in various combinations, may be required to confirm a single signature.

As will be appreciated, and not shown for clarity, included is the configuration where one or more receiver parties also play the role of confirmer(s) to some verifier(s) at a time after the signature issuing. Also as will be similarly appreciated, included is the configuration where one or more receiver parties also play the role of confirmer to some verifier(s).

Figure 3:
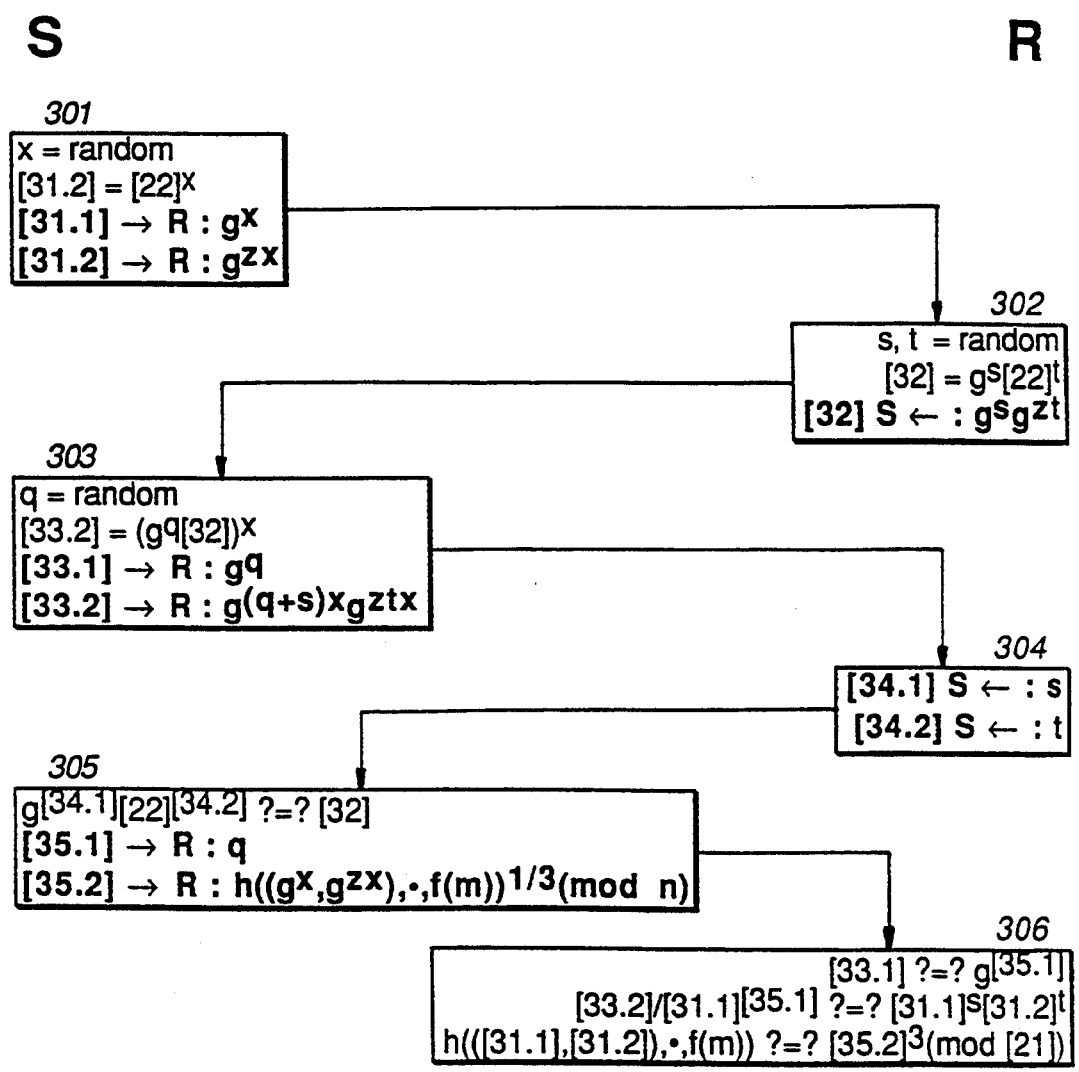
FIG. 3 shows a flowchart of a preferred embodiment of a designated confirmer signature issuing protocol between a signer party and a recipient party in accordance with the teachings of the present invention.

As also will be appreciated, signer 101 can be regarded as a signing means and/or method comprising the part of FIG. 2 (box 201) and FIG. 3 (odd numbered boxes); Receiver 102 can be regarded as a receiving means and/or method comprising part of FIG. 2 (box 202) and part of FIG. 3 (even numbered boxes); verifier 103 can be regarded as a verifier means and/or method comprising part of FIG. 4 (odd numbered boxes) and FIG. 5 (even numbered box); and confirmer 104 can be regarded as a confirming means and/or method comprising part of FIG. 4 (even numbered boxes) and FIG. 5 (odd numbered box). Similarly, signature 11 can be regarded as the means and/or method of FIG. 3 or the data exchanged; and confirmation 13 can be regarded as the means and/or method of FIGS. 4 and 5.

DETAILED DESCRIPTION OF PREFERRED EMBODIMENTS

While it is believed that the notation of FIGS. 2–6 would be clear to those of ordinary skill in the art, it is first reviewed here for definiteness.

The operations performed are grouped together into flowchart boxes. The column that a box is in indicates which party performs the operations defined in that box. The columns are labeled by party name across the top: "S" for signer 101, "R" for receiver 102, "V" for verifier(s) 103, and "C" for confirmer(s) 104.

One kind of operation is an equality test. The "?=?" symbol is used to indicate such a test, and the party conducting the test terminates the protocol if the equality does not hold. (If the test is the last operation to be performed by a party during a protocol, then the success or failure of the test determines the party's success or failure with the protocol.)

Another kind of operation is that of sending a message. This is shown by a message number on the left; followed by a recipient name and an arrow (these appear for readability as either a recipient name then left pointing arrow, when the recipient is on the left; or fight pointing arrow then recipient name, when the recipient is on the right); followed by a colon; finally followed by an expression denoting the actual value of the message that should be sent. (These operations are depicted in a "bold" typeface for clarity.) Square brackets are used to delimit message numbers and such an expression stands for the value of the corresponding message.

The further operation of saving a value under a symbolic name is denoted by the symbolic name on the left hand side of an equal sign and an expression on the fight hand side.

Several kinds of expressions are used. One is just the word "random." This indicates that a value is preferably chosen uniformly from an appropriate set of values (defined in the text where not obvious to those of skill in the art) and that is chosen independently of everything else in the protocol. Creation of random values has already been mentioned.

A further kind of expression involves exponentiation. All such exponentiation (unless noted otherwise) is in a finite group. When no operation is shown explicitly, multiplication in such a group is assumed. When "/" is applied between elements of such a group, the result can be calculated by first computing the multiplicative inverse of the expression on the right and then multiplying it by the expression on the left—but this operation may also be described simply as division. When the "/" is used between exponents, and if the result is a proper fraction, it indicates a corresponding root, as is well known in the art.

The particular choice of the group under which the exemplary embodiments may operate is not essential to the invention, however, for completeness some exemplary groups believed suitable will now be discussed along with their representations and some relevant considerations.

One general category of preferred exemplary embodiment would use a group of prime order. Such a group should preferably have a representation for which the already mentioned discrete log problem is believed difficult to solve in practice and for which the group operation and exponentiation are readily performed. Some such groups are now described.

Many suitable groups and representations are known in the art, such as those disclosed in U.S. Pat. No. 4,947,430 already mentioned, by the present applicant, which is included here by reference. Nevertheless, an exemplary construction believed suitable will now be described for completeness. It is based on the multiplicative group of residue classes modulo q, with $q-1=2p$ and p a prime, whose least positive representatives are less than or equal to p. The group operation is ordinary multiplication modulo p, except that the result is normalized by taking either the product itself or its additive inverse, whichever has the smaller least positive representative. Thus, all integers between 1 and p inclusive may be regarded as representing the members of the group, such membership being easy to check and such members being easy to map to from some original message space.

The function f is a public one-way function. It is taken to be preferably "collision free" in the usual sense that it is believed computationally difficult to find multiple pre-images that result in the same image. The number of arguments shown may vary, although the distinction introduced can be viewed as being of little consequence as, for instance, the binary representations of multiple inputs can be concatenated or that of a single argument can be split. These functions are sometimes assumed in the art to embody conditioning properties as already described.

Turning now to FIG. 2, a preferred embodiment of a private key creation and public key issuing for two parties will now be described in detail. It may be thought of as a transaction means or preparation step in which party S and party C each create their own private keys and issue the corresponding public keys to the receiver R not shown for clarity.

Box 201 starts off with signer 101 producing two values $p'$ and $q'$ at random, such random creation of values as has already been described. In this case, unlike in the rest of the figures, these two values are chosen as prime numbers. Methods and means for creating primes from random strings are well known in the art. Next the product of $p'$ and $q'$ is formed by Signer 101, and the result is labeled n. Unlike other products not explicitly described, this one is a simple integer product and not an operation in a group of prime order. In message [21] signer 101 communicates public key n to at least receiver R. Of course, as is well known in the art, such public keys may be distributed to any number of parties, and as their name suggests, they may just become a matter of public record.

Box 202 shows how C, confirmer party 103, first creates a random group element z and then raises the public generator g to the z power in the group to form a public key (subsequent group operations not being indicated explicitly for clarity). This public key is then provided, in message [22] sent by C, to receiver 102 and to signer 101. As already mentioned with respect to box 201, such public keys may of course have far wider distribution.

Turning now to FIG. 3, a preferred embodiment of a designated confirmer signature will now be described in detail. It may be thought of as a transaction means or method in which party R obtains such a signature from party S.

Box 301 begins by showing party S first creating a value x at random. Then S is shown forming message [31.2] by taking the value received in FIG. 2 of message [22] and raising it to the x power. The first message sent by S to R is [31.1], which has a value of g to the x power. The second message sent, [31.2], has the value g raised to the z times x.

Box 302 indicates how R, after receiving messages [31.1] and [31.2], generates two values at random, s and t. The message [32] is formed using these values: g is raised to the s power and the result is multiplied by the result of raising message [22] received as shown in FIG. 2, to the t power. Thus the value of message [32] sent by R to S is g raised to the s times g raised to the product of z times t.

Box 303 depicts S creating a random value q. Then message [33.2] is formed as the result of raising a quantity to the x power. The quantity consists of the product of g raised to the q and message [32] received. The value of message [33.1] sent by S to R is g raised to the q power. The value of message [33.2] sent by S to R is the product of two powers of g. The exponent of the first power is x times the sum of q and s; the exponent of the second power is the product of z, t and x.

Box 304 is simply the providing of the values s and t by R to S as messages [34.1] and [34.2], respectively.

Box 305 makes a test, and if it succeeds, sends its two messages. The test is for equality between message [32] received, on the one side, and the product of two powers on the other. The first power has g in the base and received message [34.1] in the exponent; the second has message [22] from FIG. 2 in the base and message [34.2] in the exponent. The first message sent R as [35.1] is simply q. The second, [35.2], is a cube root modulo the composite n issued by S in message [21]. The root is on an image under a combining function h, as already generally described. The first argument of h is the pair consisting of the undeniable signature g raised to the power x and g raised to the product of z and x ([31.1] and [31.2]), and the third is the image of m under f. As will be appreciated, and as already mentioned, plural undeniable signatures could be included in the signature of message [35.2]. And this is shown by the second argument, indicated by the ".", symbol, which stands for one or more undeniable signatures that could additionally be input to h.

Box 306 consists of three equalities tested by R. The first is between received message [33.1] on one side and g raised to the value of received message [35.1] on the other. The second has on one side the received message [33.2] times the multiplicative inverse of the exponentiation of received message [31.1] by received message [35.1]. The second side of the second is the product of received message [31.1] and received message [31.2], each respectively raised to the s or t power. The third equality takes as one comparand the least positive representative of the third power of message [35.2] modulo message [21] from FIG. 2. The other comparand is an image under the combining function h, which has three arguments. The first is the pair consisting of messages [31.1] and [31.2], which comprise the undeniable signature. The second argument is the place holder "." already mentioned standing for any additional arguments. And the third argument is just the image of m under the one-way function f.

It is believed that the form of signature is not undeniable by S. That is, S cannot prove that S did not issue a particular such signature. As will be appreciated, however, S could also issue an undeniable signature if such a property were desired.

Figure 4:
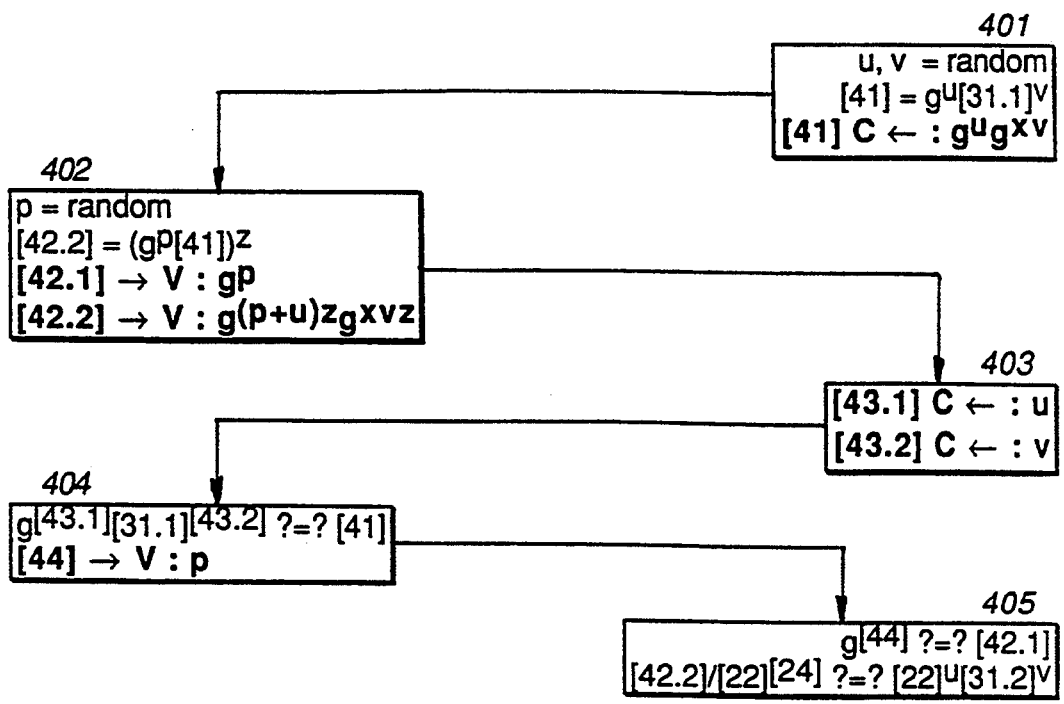
FIG. 4 shows a flowchart of a first preferred exemplary embodiment of a designated confirmer signature confirming protocol between a recipient party and a confirmer party in accordance with the teachings of the present invention, in which an identified confirmer is believe to convince the verifier without allowing the verifier to convince further parties.

Turning now to FIG. 4, a preferred embodiment of a designated confirmer confirmation protocol will now be described in detail. It may be thought of as a transaction in which party V is convinced by party C that a signature previously issued, such as in the exemplary embodiment of FIG. 3, is in fact valid, and in such a way that a transcript of data exchanged would not be convincing to another party.

Box 401 begins by showing the creation by V of a challenge [41] that will be sent to C. For this, two random values, u and v are created by V. The message [41] is constructed as g raised to the u power the quantity time message [31.1] (received in FIG. 3) raised to the v power. Thus the form of message [41] is g raised to u the quantity times g raised to the x times v power.

Box 402 develops a value p at random. Then message [42.2] is constructed as the z power of g raised to the p the quantity times message [41] received. Message [42.1] sent to V is simply g to the p. Message [42.2], sent to V, consists of two terms. The first term is g raised to the product of the sum p plus u the quantity times z. The second term is g raised to the product of x, v and z.

Box 403 simply depicts u and v being sent by V to R as, respectively messages [43.1] and [43.2].

Box 404 has R test an equality before sending p to V as message [44]. On one side of the equality is message [41] received. On the other is the product of powers with bases g and message [31.1] (from FIG. 3) and with respective exponents being received messages [43.1] and [43.2].

Box 405 test first that g raised to the value of message [44] received is equal to the value of message [42.1] received. Then a final equality is tested. On one side is message [42.2] times the multiplicative inverse of message [22] (from FIG. 2) raised to the received message [44] power. On the other side is message [22] (from FIG. 2) raised to the u and the result multiplied with message [31.2] (from FIG. 3) raised to the v.

This protocol is believed to reveal the public key of the confirmer to the verifier. As has already been suggested, such linking of confirming to a public key may, in certain situations, be undesirable. As will be obvious to those of skill in the art, the blinding techniques disclosed in U.S. Pat. No. 4,947,430, titled "Blind signature systems," issued to the present applicant, can readily be applied to "blind" the public key. This would make the public key unlinkable to the confirmer.

Figure 5:
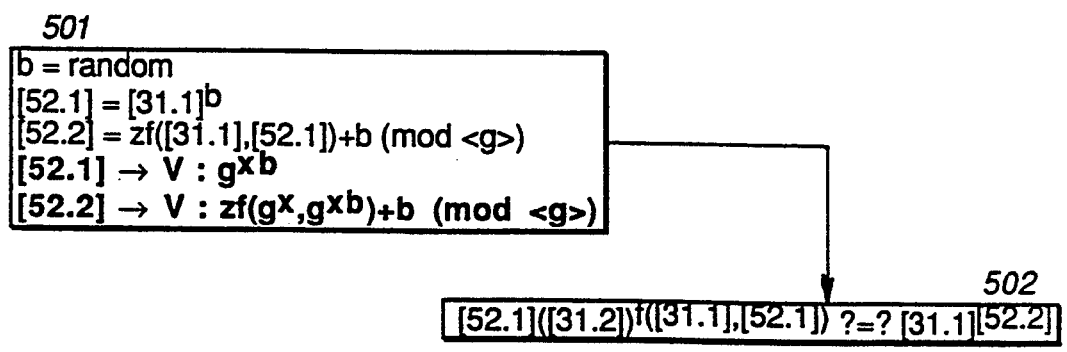
FIG. 5 shows a flowchart of a second preferred exemplary embodiment of a designated confirmer signature confirming protocol between a recipient party and a confirmer party in accordance with the teachings of the present invention, in which it is believed a potentially anonymous confirmer releases a self-authenticating signature to the verifier.

Turning now to FIG. 5, a second preferred embodiment of a designated confirmer confirmation protocol will now be described in detail. It may be thought of as a transaction in which party V receives from party C a self-authenticating signature, based on one previously issued in hinged form by party S.

Box 501 begins by showing how C choose a value b at random. Then message [52.1] is formed by raising message [31.1], from FIG. 3, to the b power. And message [52.2] is formed as b plus the product of an image under f with z. This arithmetic is done modulo the order of the default group, indicated by the notation $<g>$. The arguments for f are message [31.1] and message [52.1], already described. Message [52.1], which is equal to g raised to the x times b power, is sent to V. Also, message [42.2], which is equal to the value already described, is sent by C to V.

Box 502 finally shows how V tests messages [52.1] and [52.2] received. Message [31.2], from FIG. 3, is raised to a power that is the image under f of messages [31.1] and message [52.1]; the result is multiplied by message [52.1] received. This quantity is compared with that obtained by raising message [31.1] to the power indicated by message [52.2]. If the equality holds, the self-authenticating signature is verified.

. This protocol is believed to hide the public key of the confirmer from the verifier. A variation would be for the confirmer to issue a signature of a type that would involves the confirmer public key in the verification.

An example is an adapted version of the protocols disclosed, for instance, in "An improved protocol for demonstrating possession of discrete logarithms and some generalizations," by the present applicant, J.-H Evertse and J. v.d. Graaf, that appeared in *Advances in Cryptology—Eurocrypt '87*, Springer-Verlag, 1988. As is well known in the art, conducting about 100 instances of this protocol in parallel and making the challenge a one-way function of the commit messages results in a self-authenticating signature. This signature would then be tied to the public key used to make it.

As would be obvious to those of ordinary skill in the art, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition and are sometimes arbitrary. Also the order in which messages are generated within a box and sent may be of little or no significance.

It will also be obvious to those of ordinary skill in the art how parts of the inventive concepts and protocols herein disclosed can be used to advantage without necessitating the complete preferred embodiment. This may be more fully appreciated in light of some examples: In many uses of the inventive concepts provisions will be made for the confirmation of signatures, and will derive value from this, even though the actual confirmations may be performed rarely if at all. And the hinged signature techniques can be applied for many other purposes, such as with the gradual release of a signature.

Certain variations and substitutions may be apparent to those of ordinary skill in the art. For example: Most practical serf-authenticating digital signature techniques could be applied instead of the RSA systems used as an example. And any undeniable signature scheme, or even a scheme without a denial protocol, might be used.

While these descriptions of the present invention have been given as examples, it will be appreciated by those of ordinary skill in the art that various modifications, alternate configurations and equivalents may be employed without departing from the spirit and scope of the present invention.

What is claimed is:

1. A method for public-key digital authentication of messages, comprising the steps of:
   creating a private key by a signing party;
   making a public key, corresponding to said private key of said signing party, verifiable by at least a receiving party;
   creating a private key by a confirming party and keeping the private key substantially unavailable to at least said receiving party;
   making a public key, corresponding to said private key of said confirming party, verifiable by at least said receiving party;
   communicating data including a signature between said signing and said receiving parties, where (a) the data is convincing to the receiving party that, by use of said private key corresponding to said public key of said confirming party, other parties can be convinced that the signature was made by the signing party, and (b) where it is substantially infeasible for the receiving party, for so long as the private key corresponding to the public key of the confirming party is unavailable to the receiving party, to convince other parties of the signature by the signing party.

2. In the method of claim 1, providing said signature to said confirming party.

3. In the method of claim 2, wherein said confirming party confirms that a signature is convincing to the receiving party but where transcripts of associated received data are substantially unconvincing to the receiving party.

4. In the method of claim 2, said confirming party confirming a signature by issuing a self-authenticating signature.

5. In the method of claim 1, said confirming party being able to confirm individual signatures without confirming any others.

6. In the method of claim 1, requiring cooperation of plural confirming parties to confirm a signature.

7. In the method of claim 1, allowing cooperation of alternate confirming parties to confirm a signature.

8. In the method of claim 7, said confirming party not revealing its identity in the confirmation process.

9. Apparatus for public-key digital authentication of messages, comprising:
   means for creating a private key by a signing party;
   means for making a public key, corresponding to said private key of said signing party, verifiable by at least a receiving party;
   means for creating a private key by a confirming party and for keeping the private key substantially unavailable to at least said receiving party;
   means for making a public key, corresponding to said private key of said confirming party, verifiable by at least said receiving party;
   means for communicating data including a signature between said signing and said receiving parties, including (a) means to ensure that the data is convincing to said receiving party that, by use of said private key corresponding to said public key of said confirming party, other parties can be convinced that the signature was made by the signing party, and also including (b) means to ensure that it is substantially infeasible for the receiving party, for so long as the private key corresponding to the public key of the confirming party is unavailable to the receiving party, to convince other parties of the signature by the signing party.

10. In the apparatus of claim 9, including means for providing said signature to said confirming party.

11. In the apparatus of claim 9, including means for said confirming party to confirm that a received signature is convincing to the receiving party, but where transcripts of associated received data are substantially unconvincing to the receiving party.

12. In the apparatus of claim 9, including means for said confirming party to confirm said signature by creating a self-authenticating signature.

13. In the apparatus of claim 9, including means for said confirming party to confirm individual signatures without confirming any others.

14. In the apparatus of claim 9, including means ensuring cooperation of plural confirming parties to confirm a said signature.

15. In the apparatus of claim 14, including means for said confirming party to conceal its identity in the confirmation.

16. In the apparatus of claim 9, including means allowing cooperation of alternate confirming parties to confirm a said signature.

17. A method for creating a first signature hinged on a second signature, comprising the steps of:
creating a first private key by a signer party;
making a corresponding first public key known to at least one other party;
forming said second signature, related to a second public key, without knowledge of the corresponding second private key; and
forming said first signature, by said signer party, depending on said second signature, such that validity of said second signature substantially means validity of said first signature and validity of said hinged signature as whole, and substantial unconvincingness of said second signature means substantial unconvincingness of said first signature and unconvincingness of said hinged signature as a whole.

18. The method of claim 17 including the further step of:
forming said first signature by replacing the output of a one-way function in a signature scheme by the output of a combining function;
said combining function taking one or more parameters of said second signature as a first input;
said combining function taking the output of said one-way function as a second input; and
said combining function producing an output such that substantial control over said first input gives substantial control over said output of said combining function.

19. The method of claim 17, including the further steps of:
issuing, by said signer party, to a receiver party, said hinged signature;
convincing, by said signer party, of said receiver party, that at least one confirmer party, corresponding with said second public key, can separately convince other parties that the hinged signature was formed using said private key; and
said signature and said convincing by said signer party being such that said receiver party is substantially unable to convince other parties knowing said first and said second public keys that said first signature was formed using said first private key.

20. The method of claim 18, including the further steps of:
issuing, by said signer party, to a receiver party, said hinged signature;
convincing, by said signer pretty, of said receiver party, that at least one confirmer party, corresponding with said second public key, can separately convince other parties that the hinged signature was formed using said private key; and
said signature and said convincing by said signer party being such that said receiver party is substantially unable to convince other parties knowing said first and said second public keys that said first signature was formed using said first private key.

21. Apparatus for creating a first signature hinged on a second signature, said apparatus comprising:
means for creating a first private key by a signer party;
means for making a corresponding first public key known to at least one other party;
means for forming said second signature, related to a second public key, without knowledge of the corresponding second private key; and
means for forming said first signature, by said signer party, depending on said second signature, such that validity of said second signature substantially means validity of said first signature and validity of said hinged signature as whole, and substantial unconvincingness of said second signature means substantial unconvincingness of said first signature and unconvincingness of said hinged signature as a whole.

22. Apparatus as in claim 21 further comprising:
means for forming said first signature by replacing the output of a one-way function in a signature scheme by the output of a combining function;
means for causing said combining function to take one or more parameters of said second signature as a first input;
means for causing said combining function to take the output of said one-way function as a second input; and
means for causing said combining function to produce an output such that substantial control over said first input gives substantial control over said output of said combining function.

23. Apparatus as in claim 21 further comprising:
means for issuing, by said signer party, to a receiver party, said hinged signature;
means for convincing, by said signer party, of said receiver party, that at least one confirmer party, corresponding with said second public key, can separately convince other parties that the hinged signature was formed using said private key; and
means for causing said signature and said convincing by said signer party to be such that said receiver party is substantially unable to convince other parties knowing said first and said second public keys that said first signature was formed using said first private key.

24. Apparatus as in claim 22 further comprising:
means for issuing, by said signer party, to a receiver party, said hinged signature;
means for convincing, by said signer party, of said receiver party, that at least one confirmer party, corresponding with said second public key, can separately convince other parties that the hinged signature was formed using said private key; and
means for causing said signature and said convincing by said signer party to be such that said receiver party is substantially unable to convince other parties knowing said first and said second public keys that said first signature was formed using said first private key.

* * * * *

UNITED STATES PATENT AND TRADEMARK OFFICE
CERTIFICATE OF CORRECTION

PATENT NO. : 5,373,558
APPLICATION NO. : 08/066669
DATED : December 13, 1994
INVENTOR(S) : David Chaum It is certified that error appears in the above-identified patent and that said Letters Patent is hereby corrected as shown below:

On the Title Page Item (54) Title:

In title, please delete "Desinated-Confirmer Signature Systems" and substitute --Designated-Confirmer Signature Systems--.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 5,373,558 | Page 1 of 1 |
| APPLICATION NO. | : 08/066669 | |
| DATED | : December 13, 1994 | |
| INVENTOR(S) | : David Chaum | |

It is certified that error appears in the above-identified patent and that said Letters Patent is hereby corrected as shown below:

<u>On the Title Page Item (54) and Column 1, lines 1 and 2 Title:</u>

In title, please delete "Desinated-Confirmer Signature Systems" and substitute --Designated-Confirmer Signature Systems--.

This certificate supersedes the Certificate of Correction issued September 1, 2009.

Signed and Sealed this

Twenty-second Day of September, 2009

David J. Kappos
*Director of the United States Patent and Trademark Office*